(12) United States Patent
Kataoka et al.

(10) Patent No.: US 9,140,409 B2
(45) Date of Patent: Sep. 22, 2015

(54) FUEL SUPPLYING DEVICE

(75) Inventors: Chiaki Kataoka, Nagakute (JP); Masaki Akagi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 13/978,968

(22) PCT Filed: Jan. 12, 2011

(86) PCT No.: PCT/JP2011/050376
§ 371 (c)(1),
(2), (4) Date: Jul. 10, 2013

(87) PCT Pub. No.: WO2012/095968
PCT Pub. Date: Jul. 19, 2012

(65) Prior Publication Data
US 2013/0291967 A1    Nov. 7, 2013

(51) Int. Cl.
*B01D 47/02* (2006.01)
*E03B 5/00* (2006.01)
(Continued)

(52) U.S. Cl.
CPC . *F17C 9/00* (2013.01); *B60K 15/03* (2013.01); *F02M 37/0023* (2013.01); *F02M 37/0058* (2013.01); *F02M 37/0094* (2013.01); *F02M 37/025* (2013.01); *F02M 37/10* (2013.01); *B60K 2015/0325* (2013.01); *B60K 2015/03111* (2013.01); *B60K 2015/03125* (2013.01); *B60K 2015/03144* (2013.01); *B60K 2015/03236* (2013.01); *F02M 2037/228* (2013.01); *Y10T 137/7976* (2015.04); *Y10T 137/86035* (2015.04);
(Continued)

(58) Field of Classification Search
CPC ............... B60K 15/03; B60K 2015/03111; B60K 2015/03125; B60K 2015/03144; B60K 2015/03236; Y10T 137/86075; Y10T 137/86035; Y10T 137/86228
USPC ........ 137/565.22, 565.17, 574, 576; 123/509, 123/511, 514
See application file for complete search history.

(56) References Cited

U.S. PATENT DOCUMENTS

| 5,979,485 A | 11/1999 | Tuckey et al. |
| 2004/0182454 A1 | 9/2004 | Atwood et al. |

(Continued)

FOREIGN PATENT DOCUMENTS

| DE | 44 27 540 A1 | 2/1996 |
| DE | 197 27 227 A1 | 1/1998 |

(Continued)

OTHER PUBLICATIONS

Aug. 25, 2014 European Search Report issued in European Application No. 11855756.0.

*Primary Examiner* — John K Fristoe, Jr.
*Assistant Examiner* — Kelsey Rohman
(74) *Attorney, Agent, or Firm* — Oliff PLC

(57) ABSTRACT

To provide a fuel supplying device that, in a fuel tank equipped with plural accommodating portions that accommodate fuel, can suppress occurrence of running-out of fuel and can send-out fuel in a short time, even when a liquid surface of fuel of a fuel tank main body tilts. A sub-cup that has a fuel filter and a storage member is disposed at each of a first accommodating portion and a second accommodating portion. A distal end of a vapor discharging pipe of a fuel pump main body (or a sending-back pipe of a pressure regulator) is disposed within a second storage member.

4 Claims, 10 Drawing Sheets

(51) Int. Cl.
*F04F 5/00* (2006.01)
*F04F 99/00* (2009.01)
*E03B 11/00* (2006.01)
*F17D 1/00* (2006.01)
*B01D 47/00* (2006.01)
*B65D 88/64* (2006.01)
*F17C 9/00* (2006.01)
*F02M 37/00* (2006.01)
*F02M 37/02* (2006.01)
*F02M 37/10* (2006.01)
*F02M 37/22* (2006.01)
*B60K 15/03* (2006.01)

(52) U.S. Cl.
CPC .. *Y10T 137/86075* (2015.04); *Y10T 137/86212* (2015.04); *Y10T 137/86228* (2015.04)

(56) References Cited

U.S. PATENT DOCUMENTS

| | | | |
|---|---|---|---|
| 2004/0237941 A1* | 12/2004 | Sinz | 123/509 |
| 2009/0095264 A1* | 4/2009 | Kawajiri et al. | 123/506 |
| 2011/0192477 A1* | 8/2011 | Siddiqui | 137/565.17 |

FOREIGN PATENT DOCUMENTS

| | | |
|---|---|---|
| JP | U-63-104671 | 7/1988 |
| JP | U-1-74355 | 5/1989 |
| JP | A-8-226357 | 9/1996 |
| JP | A-2003-139006 | 5/2003 |
| JP | A-2008-128068 | 6/2008 |
| JP | 2008-240687 | 10/2008 |
| JP | N-2009-506962 | 12/2009 |

\* cited by examiner

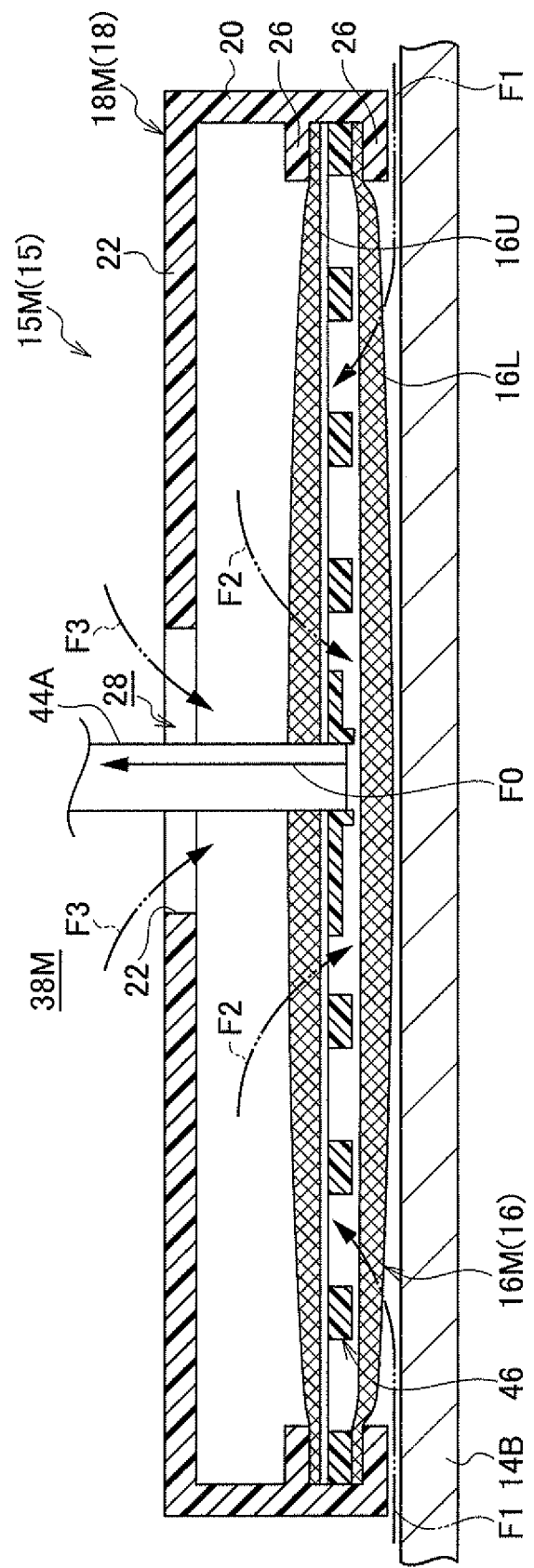

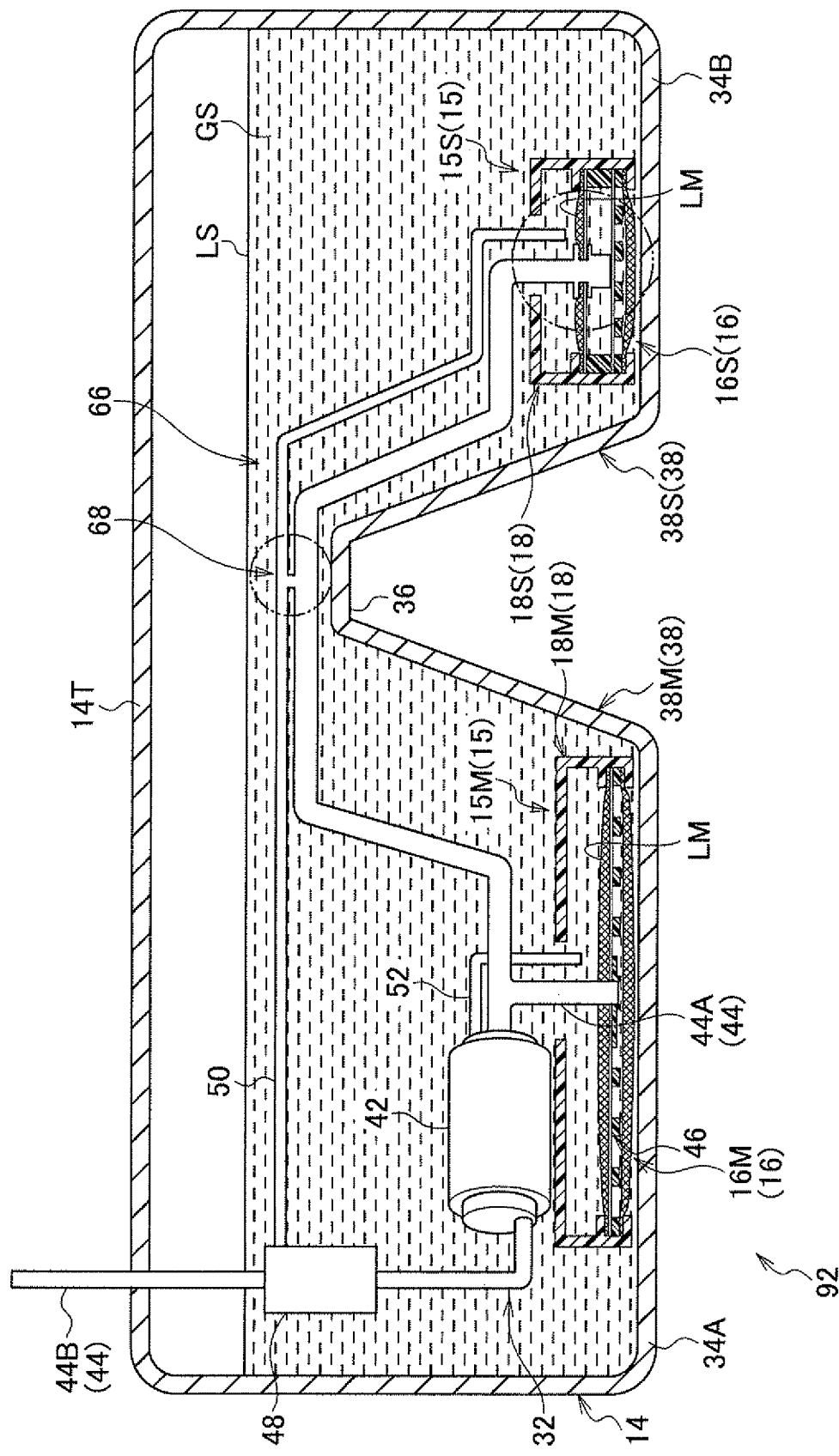

FUEL SUPPLYING DEVICE

TECHNICAL FIELD

The present invention relates to a fuel supplying device, and, in more detail, relates to a fuel supplying device for supplying fuel within a fuel tank to an engine or the like.

BACKGROUND ART

Among fuel supplying devices that supply fuel within a fuel tank to an exterior device such as an engine or the like, there are fuel supplying devices that are provided with a fuel filter within a fuel tank main body and that send-out fuel, that is in a state in which foreign matter has been removed therefrom by the fuel filter, from within the fuel filter to the exterior. For example, a structure in which a protector that is rigid is surrounded by a filter cloth is disclosed in Japanese Patent Application Laid-Open No. 2003-139006 (Patent Document 1).

In the structure of Patent Document 1, because the space within the filter cloth is ensured by the protector, fuel can be maintained within the filter cloth at times when the fuel tank is horizontal. However, in cases in which the fuel tank tilts or g force is applied to the fuel tank (hereinafter, these cases are collectively called "times when the liquid surface of the fuel tilts"), when the fuel within the fuel tank moves away from the filter cloth, the oil film at the surface of the filter cloth is broken, and the fuel within the filter cloth flows-out the exterior (the interior of the fuel tank), and therefore, there is the concern that so-called running-out of fuel will occur.

To address this, a fuel supplying device of a structure in which a cell-shaped cup is disposed at the top surface of a suction filter and a given amount of fuel held within the cup is supplied to the filter, is disclosed in the Journal of Technical Disclosure of the Japan Institute of Invention and Innovation No. 2009-506962 (Non-Patent Document 1). By holding fuel on the fuel filter and causing the fuel to contact the fuel filter in this way, the oil film of the fuel filter can be maintained.

By the way, as the structure of a fuel tank, there is a structure that is provided with plural accommodating portions for accommodating fuel. Because the fuel pump is disposed at one (this is called the "first fuel accommodating portion") of the plural accommodating portions, fuel must be transported to the first fuel accommodating portion from the accommodating portion at which the fuel pump is not disposed (this is called the "second fuel accommodating portion").

Also in a fuel tank having plural accommodating portions, it can be thought that a fuel filter with a cup, such as that disclosed in Non-Patent Document 1, is disposed at each of the accommodating portions. However, for example, in a state in which the fuel filter of the second fuel accommodating portion is not immersed, even if an attempt is made to transport fuel from the second fuel accommodating portion to the first fuel accommodating portion, a vapor component is transported from the interior of the fuel filter of the second fuel accommodating portion, and therefore, there is the concern that a long time will be required in order to send-out fuel from the first fuel accommodating portion.

DISCLOSURE OF INVENTION

Technical Problem

In view of the above-described circumstances, a topic of the present invention is to provide a fuel supplying device that, in a fuel tank that is provided with plural accommodating portions that accommodate fuel, can suppress the occurrence of fuel supply exhaustion and can deliver fuel in a short time, even when the liquid surface of the fuel of the fuel tank tilts.

Solution to Problem

The present invention comprises: a first fuel accommodating portion and a second fuel accommodating portion that accommodate fuel; a first fuel filter that is formed in a shape of a bag and is provided at the first fuel accommodating portion, and, when fuel flows into an interior of the first fuel filter, the first fuel filter removes foreign matter from the fuel, and, in a state in which a portion or an entirety of the first fuel filter is immersed in fuel, an oil film produced by the fuel is formed at a surface of the first fuel filter; a second fuel filter that is formed in a shape of a bag and is provided at the second fuel accommodating portion, and, when fuel flows into an interior of the second fuel filter, the second fuel filter removes foreign matter from the fuel, and, in a state in which a portion or an entirety of the second fuel filter is immersed in fuel, an oil film produced by the fuel is formed at a surface of the second fuel filter; a first storage member that is provided within the first accommodating portion and above the first fuel filter, a bottom portion of the first storage member being structured by at least one portion of an upper surface of the first fuel filter, and the first storage member being configured to store fuel; a second storage member that is provided within the second accommodating portion and above the second fuel filter, a bottom portion of the second storage member being structured by at least one portion of an upper surface of the second fuel filter, and the second storage member being configured to store fuel; a delivery means that delivers fuel to an exterior, and that is provided with a delivery pipe that extends from within the first fuel filter to an exterior of the first fuel accommodating portion, and a fuel pump that is provided at the delivery pipe; a fuel transporting pipe that communicates the second fuel filter interior with a fuel suction port of the fuel pump; and a sending-back pipe that, by operation of the fuel pump, is configured to send back, to an interior of the second storage member, a portion of the fuel that flows through the delivery means.

In this fuel supplying device, the first fuel filter and the first storage member are provided at the first fuel accommodating portion, and the second fuel filter and the second storage member are provided at the second fuel accommodating portion. Due to the driving of the fuel pump that structures the delivery means, fuel within the first fuel accommodating portion passes through the first fuel filter (at this time, foreign matter of the fuel is removed), and flows into the interior of the first fuel filter. Then, the fuel at the interior of the first fuel filter is delivered through the delivery pipe to the exterior.

In the state in which a portion of or the entire first fuel filter is immersed in fuel, an oil film of the fuel is formed at the surface of the first fuel filter, and therefore, fuel within the first fuel filter does not flow out. As a result, fuel can be delivered to the exterior without causing fuel supply exhaustion.

The first storage member that can store fuel is provided above the first fuel filter. The bottom portion of the first storage member is structured by at least a portion of the upper surface of the first fuel filter. Accordingly, when the liquid surface of the fuel of the first storage member tilts, even if the fuel within the first fuel accommodating portion (at the exterior of the first storage member) moves away from the first fuel filter, the fuel stored at the interior of the first storage member can maintain the state of contacting the upper surface of the first fuel filter, and therefore, the oil film of the surface of the first fuel filter is maintained. As a result, flowing-out of the fuel within the first fuel filter can be prevented, and fuel can be delivered to the exterior without causing fuel supply exhaustion.

Further, due to driving of the fuel pump, fuel within the second fuel accommodating portion passes through the second fuel filter (at this time, foreign matter is removed from the fuel), and flows into the interior of the second fuel filter. Then, the fuel at the interior of the second fuel filter is transported through the fuel transporting pipe to the fuel pump.

In the state in which a portion of or the entire second fuel filter is immersed in fuel, an oil film of the fuel is formed at the surface of the second fuel filter, and therefore, fuel within the second fuel filter does not flow out. As a result, fuel can be delivered to the exterior without causing fuel supply exhaustion.

The second storage member that can store fuel is provided above the second fuel filter. The bottom portion of the second storage member is structured by at least a portion of the upper surface of the second fuel filter. Accordingly, when the liquid surface of the fuel of the second storage member tilts, even if the fuel within the second fuel accommodating portion (at the exterior of the second storage member) moves away from the second fuel filter, the fuel stored at the interior of the second storage member can maintain the state of contacting the upper surface of the second fuel filter, and therefore, the oil film of the surface of the second fuel filter is maintained. As a result, flowing-out of the fuel within the second fuel filter can be prevented, and fuel can be transported to the first storage portion interior without causing fuel supply exhaustion.

Further, this fuel supplying device has the sending-back pipe. Due to driving of the fuel pump, the sending-back pipe returns, to the second storage member interior, a portion of the fuel that flows through the delivery means (which may be the fuel pump or may be the delivery pipe). Therefore, the state in which fuel exists at the second storage member interior, i.e., the state in which fuel contacts the upper surface of the second fuel filter, can be maintained more reliably. The oil film of the second fuel filter is maintained, suctioning of vapor into the second fuel filter interior can be suppressed, and transportation of a vapor component from the second fuel accommodating portion (the second fuel filter) toward the first accommodating portion (the first storage member) can also be suppressed. As a result, delivery of fuel from the first accommodating portion by driving of the fuel pump can be carried out in a short time.

The present invention may be structured such that the sending-back pipe is a vapor discharging pipe for discharging fuel including vapor that is within the fuel pump, and one end of the vapor discharging pipe is connected to the fuel pump, and another end is disposed within the second storage member.

As a result, the sending-back pipe can be structured by effectively using a vapor discharging pipe.

The present invention may be structured such that a pressure regulator that carries out pressure adjustment of delivered fuel is provided at the delivery pipe, and the sending-back pipe is a return pipe for discharging fuel returned from the pressure regulator, and one end of the return pipe is connected to the pressure regulator, and another end is disposed within the second storage member.

As a result, the sending-back pipe can be structured by effectively using a return pipe.

The present invention may be structured so as to comprise an opening/closing valve that is provided at the fuel transporting pipe, and that is opened when the fuel within the second fuel filter exceeds a predetermined amount, and is closed when the fuel within the second fuel filter is less than or equal to the predetermined amount.

As a result, in the state in which the fuel within the second fuel filter becomes less than or equal to the predetermined amount, transportation of a vapor component from the second fuel filter interior to the first storage member due to driving of the fuel pump can be prevented.

Note that this "predetermined amount" is a threshold value at which the concern arises that a vapor component will be transported from the second fuel filter interior toward the first storage member. If fuel exceeding this predetermined amount exists within the second fuel filter, even if the opening/closing valve opens, the vapor component is not transported toward the first storage member.

As the opening/closing valve, a structure may be provided in which the opening/closing valve is a float valve that, when there is fuel in excess of the predetermined amount within the second fuel filter, floats in the fuel and rises and thereby enters into an open state, and, when the fuel is less than or equal to the predetermined amount, falls and enters into a closed state.

As a result, the opening/closing valve can be structured without requiring a complex mechanism.

A structure in which the opening/closing valve is a float valve may be structured such that a space maintaining member for maintaining a predetermined space within the second fuel filter is provided within the second fuel filter, and at least a portion of the space maintaining member comprises a guiding member that guides vertical movement of the float valve.

As a result of the space maintaining member, a space for storing fuel can be maintained at the interior of the second storage member.

Further, by guiding the vertical movement of the float valve with a guiding member, stable behavior of the float valve is enabled.

Because the guiding member structures at least a portion of the space maintaining member, the number of parts is few as compared with a structure in which the guiding member is disposed independently.

The present invention may be structured so as to comprise: a communication portion that communicates the fuel transporting pipe with the sending-back pipe; and a jet pump that is provided at the communication portion, and generates negative pressure as a result of fuel that flows through the sending-back pipe, and, by applying the negative pressure to an interior of the fuel transporting pipe, the jet pump generates a flow of fuel from the second fuel filter interior toward an interior of the first storage member.

Pressure that transports fuel from the second fuel filter interior toward the first storage member interior is generated not only by the fuel pump, but by the jet pump as well, and efficient transporting of fuel is possible.

Moreover, the negative pressure of the return pipe acts on the fuel transporting pipe through the communication portion. Therefore, even if a vapor component exists within the fuel that is within the fuel transporting pipe, at least a portion of this vapor component is moved to the return pipe and can be returned to the interior of the second storage member.

The structure that is provided with this jet pump may be structured such that the communication portion is provided at a highest position of the fuel transporting pipe.

As a result, a vapor component within the fuel transporting pipe can be effectively moved to the return pipe.

The present invention may be structured such that a pressure loss of the delivery pipe, at a fuel delivery direction upstream side of the fuel pump, is set to be greater than a pressure loss of the fuel transporting pipe.

As a result, when the fuel pump is driven, before the fuel within the first fuel filter is consumed, the fuel within the second fuel filter is consumed first. Therefore, as compared with a case in which fuel within the first fuel filter is consumed first, fuel supply exhaustion can be suppressed more reliably.

Advantageous Effects of Invention

Because the present invention has the above-described configuration, in a fuel tank that is provided with plural accommodating portions that accommodate fuel, the occurrence of fuel supply exhaustion can be suppressed and fuel can be delivered in a short time, even when the liquid surface of the fuel of the fuel tank tilts.

BRIEF DESCRIPTION OF DRAWINGS

FIG. 2 is a cross-sectional view showing, partially and in an enlarged manner, a first sub-cup of the fuel supplying device of the first embodiment of the present invention.

FIG. 7 is a cross-sectional view showing a fuel supplying device of a second embodiment of the present invention, together with the overall structure of the fuel tank main body in a state in which a sufficient amount of fuel exists within the fuel tank main body.

BEST MODES FOR CARRYING OUT THE INVENTION

Figure 1A:
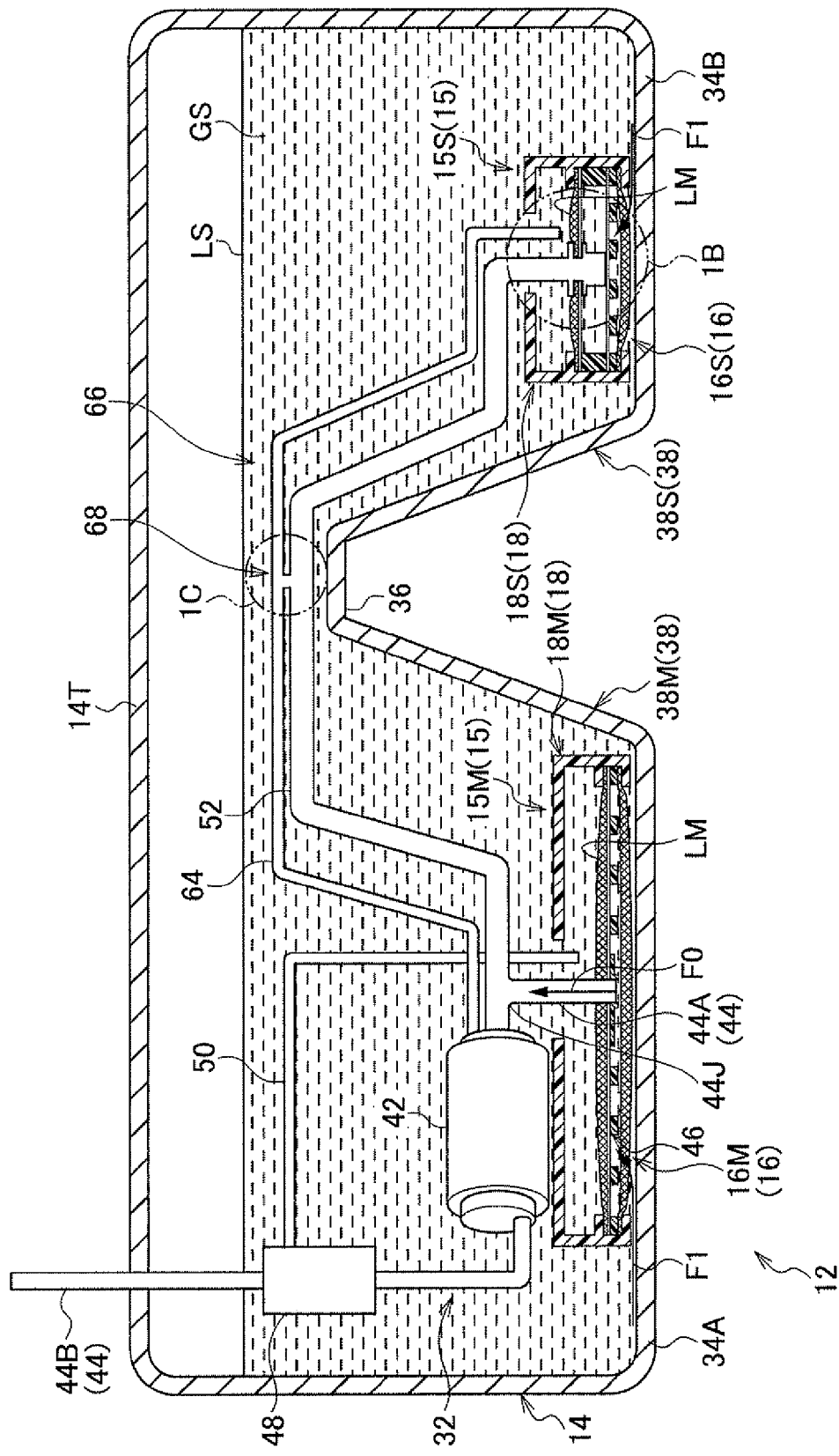
FIG. 1A is a cross-sectional view showing a fuel supplying device of a first embodiment of the present invention, together with the overall structure of a fuel tank main body in a state in which a sufficient amount of fuel exists within the fuel tank main body.

The overall structure of a fuel supplying device 12 of a first embodiment of the present invention is shown in FIG. 1A. Further, the fuel supplying device 12 is shown partially and in an enlarged manner in FIG. 1B, FIG. 1C and FIG. 2 through FIG. 4. In FIG. 1B, FIG. 1C, FIG. 2 and FIG. 3, the fuel is omitted for convenience of illustration, but, in actuality, fuel GS exists appropriately within the fuel tank main body 14.

This fuel supplying device 12 has a fuel tank main body 14 in which the fuel GS is accommodated. The fuel tank main body 14 of the present embodiment has two low position portions 34A, 34B at both sides in the transverse direction, and, between these low position portions 34A, 34B, a high position portion 36 that is formed at a position that is relatively higher than the low position portions 34A, 34B. Namely, at the fuel tank main body 14, the low position portions 34A, 34B are formed at the both sides of the single high position portion 36, and the fuel tank main body 14 is, overall, a saddle-shaped fuel tank having a first fuel accommodating portion 38M and a second fuel accommodating portion 38S.

Note that the present embodiment gives an example in which the first fuel accommodating portion 38M is formed to be larger than the second fuel accommodating portion 38S. However, the relationship between the relative magnitudes of the volumes thereof is not limited, and the first fuel accommodating portion 38M and the second fuel accommodating portion 38S may have volumes of about the same extent. Hereinafter, in cases in which there is no particular need to differentiate between the first fuel accommodating portion 38M and the second fuel accommodating portion 38S, explanation is given simply of a fuel accommodating portion 38.

An unillustrated inlet pipe is provided at the upper portion of the first fuel accommodating portion 38M side, and fuel can be supplied to the first fuel accommodating portion 38M. Members that structure the automobile, such as a transaxle and the like for example, are disposed between the first fuel accommodating portion 38M and the second fuel accommodating portion (beneath the high position portion 36), and efficient utilization of the space is devised.

A first sub-cup 15M is disposed in the first fuel accommodating portion 38M, and a second sub-cup 15S is disposed in the second fuel accommodating portion 38S. The sizes of the first sub-cup 15M and the second sub-cup 15S differ in accordance with the capacities of the first fuel accommodating portion 38M and the second fuel accommodating portion 38S, but the basic structures thereof are the same. Hereinafter, in cases in which there is no particular need to differentiate between the first sub-cup 15M and the second sub-cup 15S, explanation is given simply of a sub-cup 15.

The sub-cup 15 has a fuel filter 16. Hereinafter, a first fuel filter 16M of the first sub-cup 15M and a second fuel filter 16S of the second sub-cup 15S are differentiated as needed, but, when there is no need to differentiate therebetween, explanation is given simply of the fuel filter 16.

The fuel filter 16 passes the fuel GS from the outer side toward the inner side thereof, and is formed substantially in a bag shape of a material (e.g., a woven cloth, a non-woven cloth, a porous resin, or the like) having the effect of, at that time, removing foreign matter within the fuel and making it such that the foreign matter does not flow into the interior of the fuel filter 16. Further, the fuel GS that has passed through the fuel filter 16 can be stored in the interior thereof.

Moreover, in a state in which at least a portion of the fuel filter 16 is immersed in the fuel within the fuel accommodating portion 38, an oil film LM due to the fuel GS is formed and maintained at the surface of the fuel filter 16.

In the present embodiment, in particular, two non-woven cloths of the same shape (e.g., the shape may be a polygonal shape such as quadrangular or the like, or may be circular or oval or the like) are joined together only at the peripheries thereof, and an upper surface filter cloth 16U and a lower surface filter cloth 16L are made to be shapes that are curved so as to be convex upwardly and downwardly, respectively. Accordingly, a space for accommodating the fuel GS is structured between the upper surface filter cloth 16U and the lower surface filter cloth 16L.

The material of the upper surface filter cloth 16U and the lower surface filter cloth 16L is not limited to the above-described non-woven cloth, and may be a woven cloth or sponge-like member, or a mesh-like member, or the like.

The fuel filter 16 (in particular, the lower surface filter cloth 16L) is disposed along a bottom wall 14B of the fuel tank main body 14 so as to be substantially parallel thereto. As shown by arrow F1 in FIG. 1, the fuel GS can be made to flow-in into the fuel filter 16 through the gap between the fuel filter 16 and the bottom wall 14B. Moreover, the fuel filter 16 extends along the bottom wall 14B, and, even when the amount of the fuel GS within the fuel accommodating portion 38 becomes low or tends toward one side or the like, the state in which a portion of the fuel filter 16 is immersed in the fuel GS can be maintained more reliably.

In the present embodiment, in particular, the upper surface filter cloth 16U and the lower surface filter cloth 16L are made to be different materials, and the materials of these filter cloths are selected such that the pressure loss of the upper surface filter cloth 16U is greater than the pressure loss of the lower surface filter cloth 16L.

What is called "pressure loss" here is the difference in pressure before and after passage at the time when the fuel GS passes-through the upper surface filter cloth 16U or the lower surface filter cloth 16L (e.g., at the time of driving a fuel pump main body 42 that is described later). Accordingly, it is relatively easier to make the fuel GS pass through the lower surface filter cloth 16L than the upper surface filter cloth 16U.

In the present embodiment, in order to provide a difference in the pressure losses in this way, the upper surface filter cloth 16U is made to be a structure in which the total surface area of the voids of the non-woven cloth is smaller than that of the lower surface filter cloth 16L. However, the pressure losses of the upper surface filter cloth 16U and the lower surface filter cloth 16L may be the same extent.

A space structuring member 46 is disposed between the upper surface filter cloth 16U and the lower surface filter cloth 16L. Due to this space structuring member 46, at the first fuel filter 16M of the first sub-cup 15M, the shape in which the upper surface filter cloth 16U is curved concavely upward and the lower surface filter cloth 16L is curved downward is maintained, and, due thereto, a space for storing the fuel GS can be reliably maintained therebetween. Further, at the second fuel filter 16S of the second sub-cup 15S in particular, two of the space structuring members 46 are disposed with an interval vertically therebetween. Due thereto, a gap, that is larger than that of the first fuel filter 16M of the first sub-cup 15M, is structured between the upper surface filter cloth 16U and the lower surface filter cloth 16L.

A storage member 18 is provided above the fuel filter 16. Hereinafter, a first storage member 18M of the first sub-cup 15M and a second storage member 18S of the second sub-cup 15S are differentiated as needed, but, when there is no need to differentiate therebetween, explanation is given simply of the storage member 18.

Figure 3:
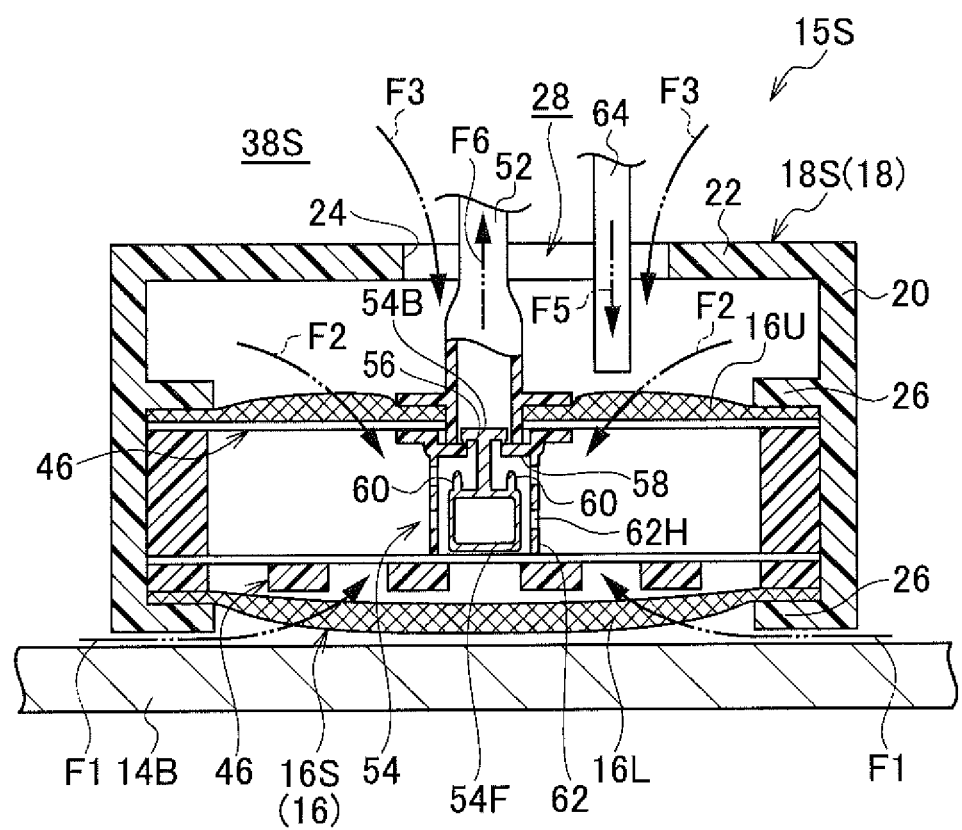
FIG. 3 is a cross-sectional view showing, partially and in an enlarged manner, a second sub-cup of the fuel supplying device of the first embodiment of the present invention.

As shown in FIG. 2 and FIG. 3, the storage member 18 of the present embodiment has a side wall tube 20 that is tube-shaped and that stands vertically from the outer edge portion of the fuel filter 16. The lower surface of the side wall tube 20 is joined (e.g., welded) to the outer peripheral portion of the fuel filter 16. The sub-cup 15 is structured by the fuel filter 16 and the storage member 18. Further, the side wall tube 20 is the peripheral edge portion of the storage member 18.

In the present embodiment, joining pieces 26 are formed at the lower portion of the side wall tube 20. The joining pieces 26 increase the joined surface area of the side wall tube 20 and the fuel filter 16 and improve the joining strength, and have the effect of suppressing upward movement of the fuel filter 16 when the fuel GS flows-in into the fuel filter 16 through the lower surface filter cloth 16L. Note that these joining pieces 26 can be omitted.

Moreover, a cover plate portion 22 extends from the upper end of the side wall tube 20 toward the center in plan view. Further, the storage member 18 is structured by the upper surface filter cloth 16U of the fuel filter 16, in addition to the side wall tube 20 and the cover plate portion 22. In other words, the bottom portion of the storage member 18 is structured by the upper surface filter cloth 16U.

The fuel GS can be stored above the fuel filter 16 within the storage member 18. A flow-in hole 24, that passes through the cover plate portion 22 in the thickness direction, is formed in the central portion of the cover plate portion 22. As shown by arrows F3, the fuel GS of the first fuel accommodating portion 38M and the second fuel accommodating portion 38S flows through the flow-in holes 24 into the interiors of the first storage member 18M and the second storage member 18S, respectively.

As can be understood from FIG. 1, a fuel pump module 32 is provided above the first sub-cup 15M of the first fuel accommodating portion 38M. The fuel pump module 32 has the fuel pump main body 42. A fuel suction pipe 44A extends downward from the fuel pump main body 42. The lower end of the fuel suction pipe 44A is inserted through the flow-in hole 24 of the first storage member 18M, and is further passes through the upper surface filter cloth 16U of the first fuel filter 16M, and opens within the fuel filter 16.

As can be understood from FIG. 2, at the first sub-cup 15M of the first fuel accommodating portion 38M, the internal dimension of the flow-in hole 24 is made to be larger than the outer diameter of the fuel suction pipe 44A. Therefore, the hole edge of the flow-in hole 24 does not contact the fuel suction pipe 44A, and, as shown by arrows F2, the fuel GS can flow into the interior of the first storage member 18M through a gap 28 therebetween.

Further, a fuel disgorge pipe 44B extends from the fuel pump main body 42 at the upper side thereof, and passes through a top wall 14T of the fuel tank main body 14 and extends-out to the exterior. Due to driving of the fuel pump main body 42, fuel is sucked-in at the fuel suction pipe 44A, and the fuel GS can be supplied to an unillustrated engine from the fuel disgorge pipe 44B. A fuel delivery pipe 44 of the present embodiment is structured by the fuel suction pipe 44A and the fuel disgorge pipe 44B.

A pressure regulator 48 is disposed midway along the fuel disgorge pipe 44B. The pressure regulator 48 adjusts pressure such that the pressure of the fuel GS, that is being sent-out from the fuel pump main body 42, is within a predetermined range, and sends the fuel GS out to the exterior (the engine or the like).

The upper end of a return pipe 50 is connected to the pressure regulator 48. The fuel GS, that becomes surplus at the time of the aforementioned pressure adjustment, is returned through the return pipe 50 to the fuel tank main body 14 interior as return fuel. In particular, in the present embodiment, the lower end of the return pipe 50 is positioned within the first storage member 18M of the first fuel accommodating portion 38M, and returns the return fuel to this first storage member 18M interior.

A merging portion 44J is set at the intermediate portion of the fuel suction pipe 44A. The merging portion 44J and the interior of the second fuel filter 16S of the second fuel accommodating portion 38S are connected by a fuel transporting pipe 52. Namely, the fuel transporting pipe 52 is connected, via a portion of the fuel suction pipe 44A, to a fuel suction port (not shown) of the fuel pump main body 42.

Because the fuel transporting pipe 52 is connected to the fuel suction port of the fuel pump main body 42 in this way, the fuel GS within the second fuel filter 16S can be sucked through the fuel transporting pipe 52 due to the driving of the fuel pump main body 42. Then, the sucked fuel GS is merged with the fuel suction pipe 44A from the merging portion 44J. Accordingly, the fuel GS within the second fuel filter 16S of the second fuel accommodating portion 38S also can be sent-out to the exterior from the fuel disgorge pipe 44B.

As shown in FIG. 3, the flow-in hole 24 is formed also in the second storage member 18S of the second fuel accommodating portion 38S. The internal dimension of the flow-in hole 24 is made to be larger than the outer diameter of the fuel transporting pipe 52. Therefore, the hole edge of the flow-in hole 24 does not contact the fuel transporting pipe 52, and the fuel GS can flow into the interior of the second storage member 18S through the gap 28 therebetween.

The pressure loss of the fuel suction pipe 44A (in particular, the portion from the lower end of the fuel suction pipe 44A to the merging portion 44J) is set to be larger than the pressure loss of the fuel transporting pipe 52. In other words, the flow resistance of the fuel GS at the fuel suction pipe 44A is larger than the flow resistance of the fuel at the fuel transporting pipe 52. Accordingly, in a case in which the fuel GS can be sucked from both the first fuel filter 16M and the second fuel filter 16S due to the driving of the fuel pump main body 42, first, the fuel GS is sucked preferentially from the second fuel filter 16S interior.

A float valve 54 is disposed at the fuel transporting pipe 52 at the portion thereof within the second fuel filter 16S. The float valve 54 is an example of the opening/closing valve of the present invention. As is shown in detail in FIG. 1B as well, the float valve 54 has a float portion 54F of a specific gravity such that the float portion 54F floats in the fuel GS within the second fuel filter 16S, and a valve portion 54B that is disc-shaped and is disposed at the upper portion of this float portion 54F. The valve portion 54B and the float portion 54F are connected by a connecting portion 54C.

Figure 1B:
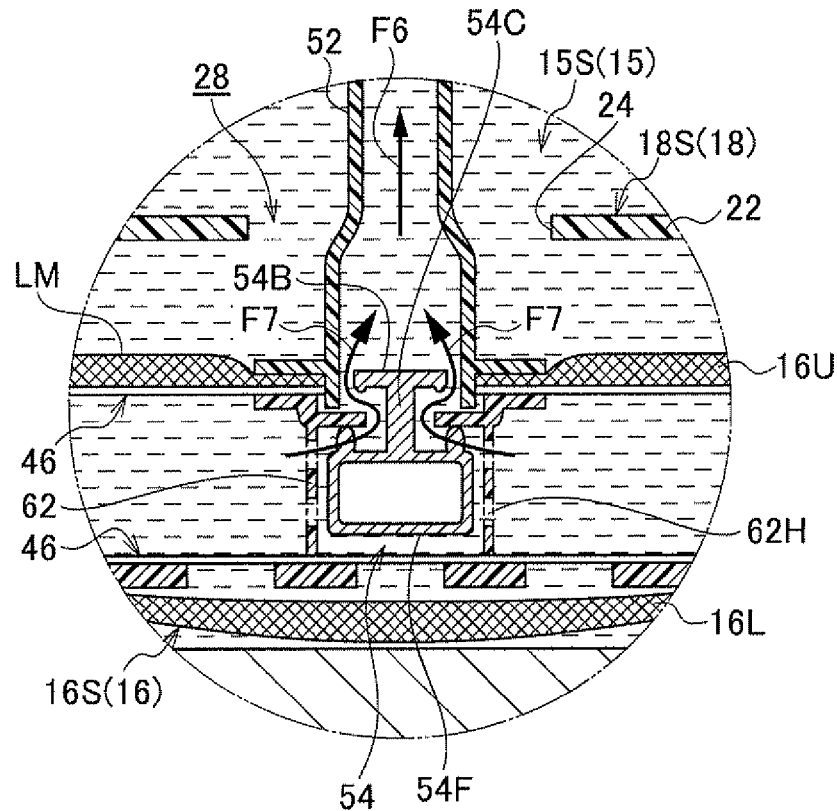
FIG. 1B is an enlarged sectional view of portion 1B of FIG. 1A, showing the fuel supplying device of the first embodiment of the present invention.
Figure 1C:
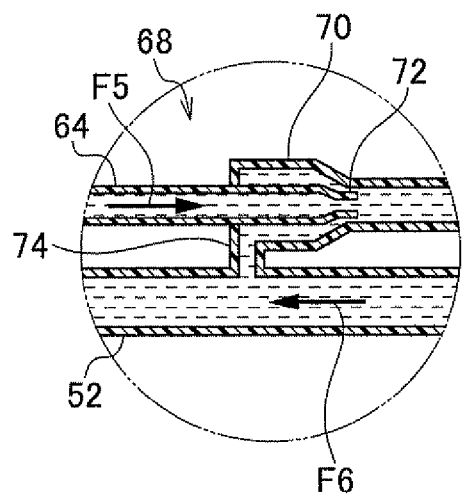
FIG. 1C is an enlarged sectional view of portion 1C of FIG. 1A, showing the fuel supplying device of the first embodiment of the present invention.
Figure 5A:
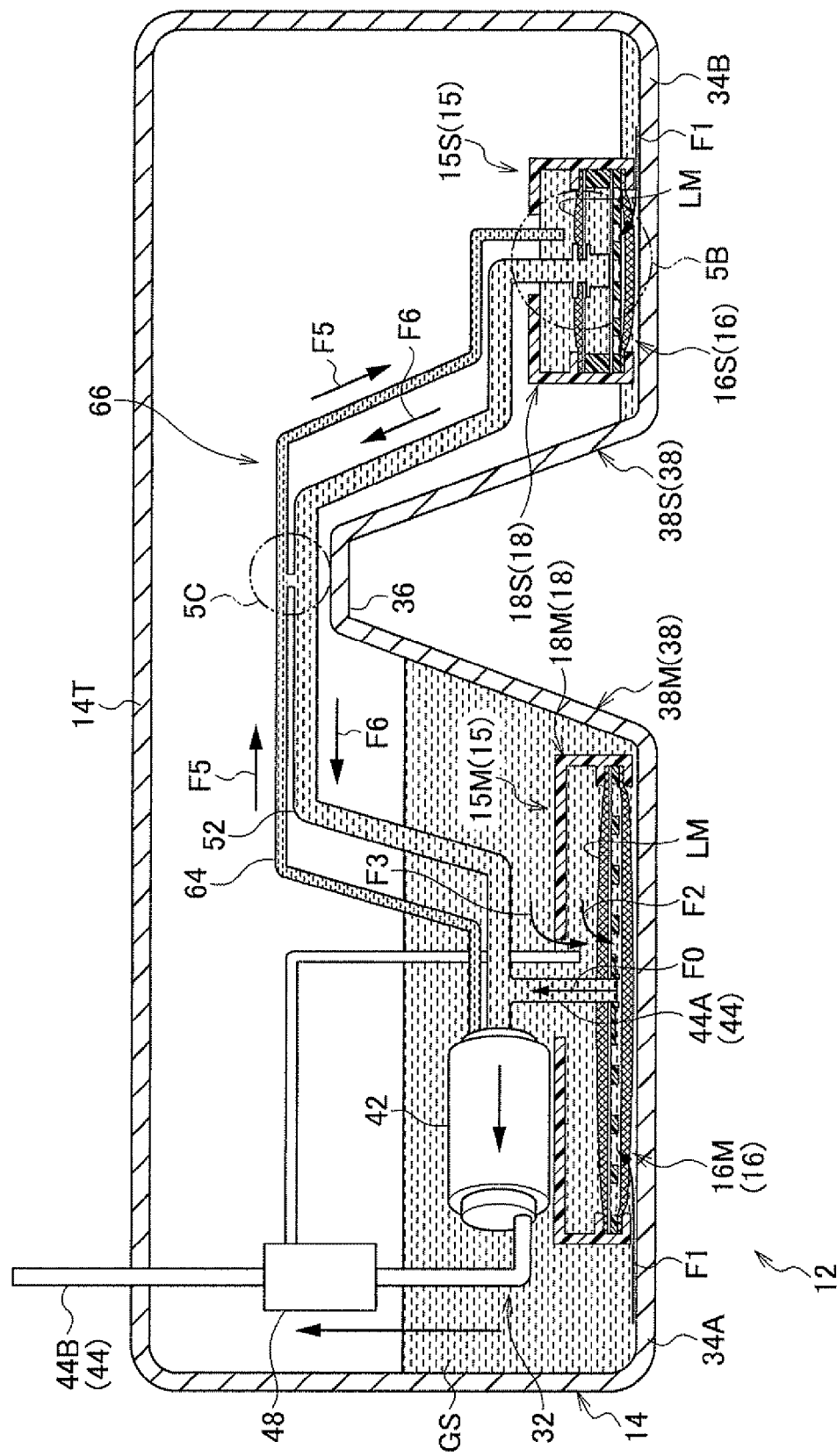
FIG. 5A is a cross-sectional view showing the fuel supplying device of the first embodiment of the present invention, together with the overall structure of the fuel tank main body in a state in which there is little fuel within a second accommodating portion.
Figure 5B:
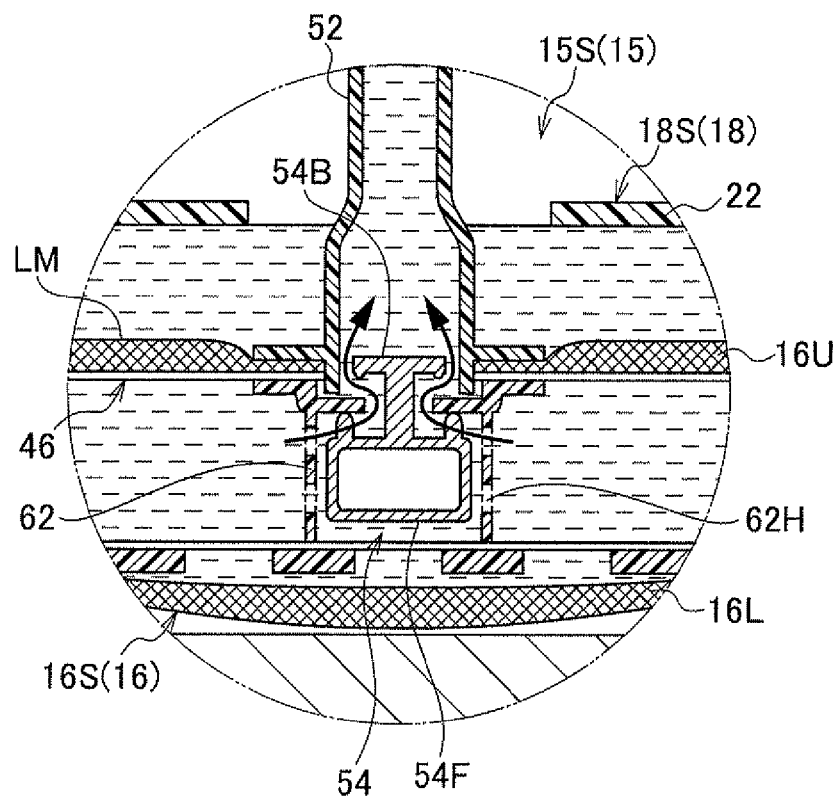
FIG. 5B is an enlarged sectional view of portion 5B of FIG. 5A, showing the fuel supplying device of the first embodiment of the present invention.

A valve seat 58 is formed at the fuel transporting pipe 52, and a through-hole 56 is formed in the center of the valve seat 58. The connecting portion 54C is inserted through, and the valve portion 54B is positioned above the valve seat 58. As shown in FIG. 1B and FIG. 5B, in a state in which an amount of the fuel GS that exceeds a predetermined amount exists within the second fuel filter 16S, the float portion 54F floats in the fuel GS, and therefore, the valve portion 54B moves away from the valve seat 58. Because the float valve 54 is open, fuel can move from the interior of the second fuel filter 16S to the fuel transporting pipe 52.

Figure 4:
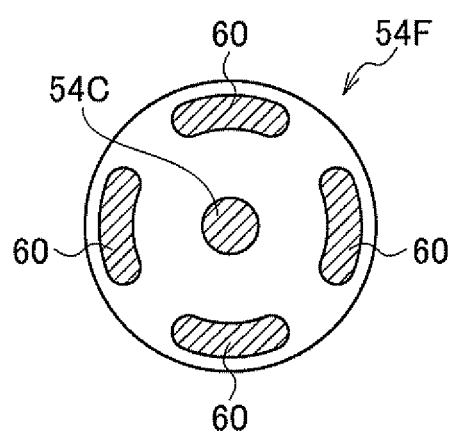
FIG. 4 is a cross-sectional view showing, in a cross-section in the horizontal direction, a float valve that structures the fuel supplying device of the first embodiment of the present invention.

Note that, as shown in detail in FIG. 3 and FIG. 4, plural ribs 60 are formed at the top surface of the float portion 54F. The ribs 60 make it such that, even if the float portion 54F floats, the float portion 54F does not fit tightly to the bottom surface of the valve seat 58. Due thereto, gaps through which the fuel GS can pass arise between the float portion 54F and the valve seat 58. The plural ribs 60 are set apart from one another, and, in the state in which the float portion 54F has risen, the fuel GS moves in the gaps between the ribs 60.

Figure 6A:
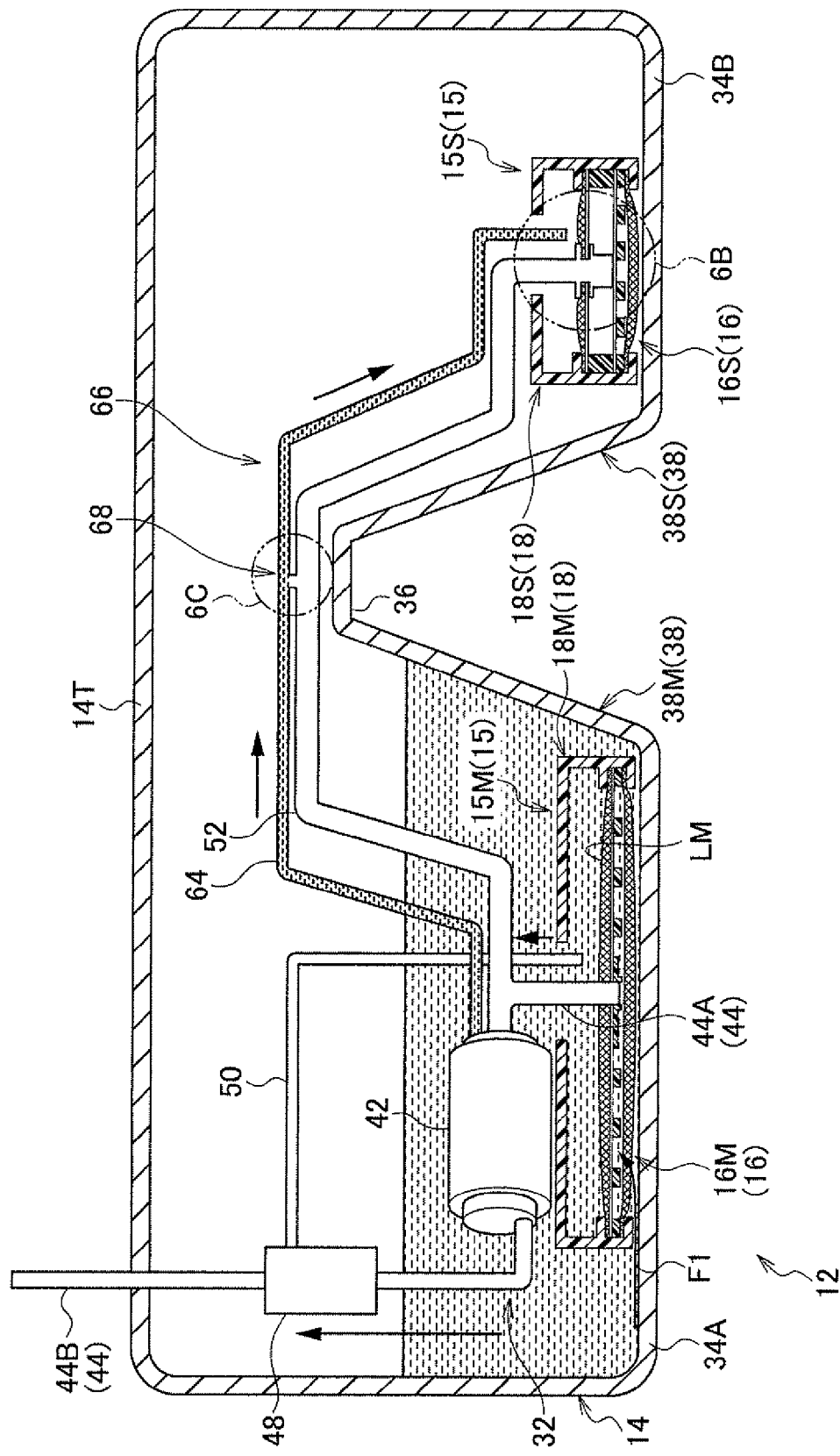
FIG. 6A is a cross-sectional view showing the fuel supplying device of the first embodiment of the present invention, together with the overall structure of the fuel tank main body in a state in which there is even less fuel within the second accommodating portion.
Figure 6B:
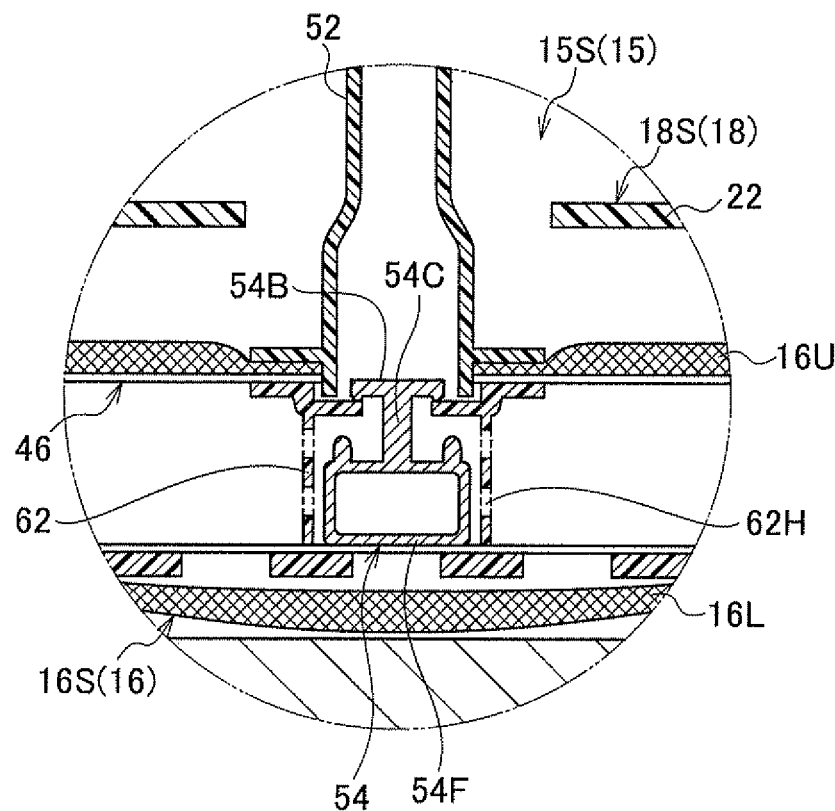
FIG. 6B is an enlarged sectional view of portion 6B of FIG. 6A, showing the fuel supplying device of the first embodiment of the present invention.
Figure 6C:
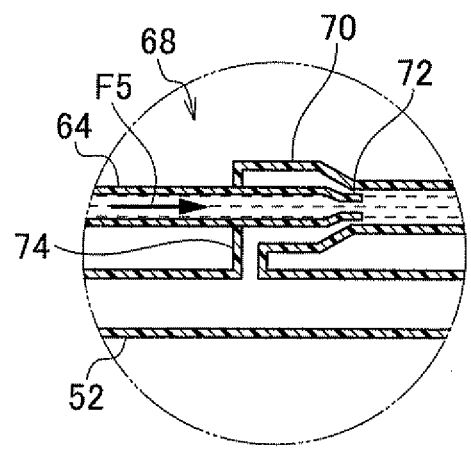
FIG. 6C is an enlarged sectional view of portion 6C of FIG. 6A, showing the fuel supplying device of the first embodiment of the present invention.

In contrast, as shown in FIG. 6B, in a case in which the amount of the fuel GS within the second fuel filter 16S is less than or equal to the predetermined amount (also including cases in which the fuel GS does not exist), the float portion 54F falls, and therefore, the valve portion 54B fits tightly to the top surface of the valve seat 58. Because the float valve 54 is closed, the vapor component within the second fuel filter 16S no longer moves to the fuel transporting pipe 52.

Note that this "predetermined amount" is a threshold value at which, in a case in which a vapor component exists within the second fuel filter 16S, there is the possibility that this vapor component will move to the fuel transporting pipe 52.

A guiding member 62 that is tubular is formed at the space structuring member 46 of the second fuel accommodating portion 38S. The guiding member 62 surrounds the float portion 54F from the periphery thereof, and, when the float portion 54 moves vertically, the guiding member 62 guides the float portion 54F vertically so that the float portion 54F does not inadvertently move in the lateral direction. Communication holes 62H are formed in the guiding member 62, and movement of the fuel GS from the outer side toward the inner side of the guiding member 62 is possible.

As shown in FIG. 1A, a vapor discharging port (not illustrated), that discharges, together with the fuel (liquid component), vapor (a vapor component) that is generated due to boiling under reduced pressure or the like of the fuel GS within the fuel pump main body 42, is provided at the fuel pump main body 42. One end of a vapor discharging pipe 64 is connected to this vapor discharging port. In the present embodiment, the vapor discharging pipe 64 is an example of the sending-back pipe of the present invention.

As shown in detail in FIG. 3 as well, the other end of the vapor discharging pipe 64 is positioned within the second storage member 18S (above the upper surface filter cloth 16U). Accordingly, vapor (the vapor component), that has been generated within the fuel pump main body 42, is discharged into the second storage member 18S together with fuel (the liquid component).

In the present embodiment, the vapor discharging pipe 64 is positioned further upward than the fuel transporting pipe 52, above the high position portion 36. Further, the intermediate portion of the fuel transporting pipe 52 and the intermediate portion of the vapor discharging pipe 64 are disposed adjacent to one another, and, at an adjacent portion 66 (the highest level of the fuel transporting pipe 52), the fuel transporting pipe 52 and the vapor discharging pipe 64 are communicated by a communication portion 74.

A jet pump 68 is provided at the communication portion 74. As shown in detail in FIG. 1C, the jet pump 68 has an enlarged diameter portion 70 at which the diameter of the vapor discharging pipe 64 is enlarged locally at the adjacent portion 66. The portion of the vapor discharging pipe 64, which portion is further toward the fuel pump main body 42 side than this enlarged diameter portion 70, extends within the enlarged diameter portion 70, and a throttle portion 72 is formed at the extending end.

Figure 5C:
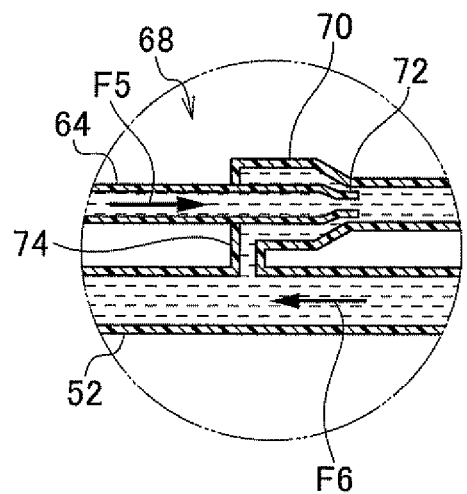
FIG. 5C is an enlarged sectional view of portion 5C of FIG. 5A, showing the fuel supplying device of the first embodiment of the present invention.

As shown in FIG. 5C as well, when the fluids (vapor and fuel), that flow through the vapor discharging pipe 64 in the arrow F5 direction, reach the enlarged diameter portion 70 from the throttle portion 72, negative pressure is generated within the enlarged diameter portion 70. This negative pressure is applied through the communication portion 74 to the fuel transporting pipe 52. Therefore, when the fuel GS within the second fuel filter 16S is sucked, not only the suction force of the fuel pump main body 42, but also the suction force due to this negative pressure is applied to the fuel GS within the second fuel filter 16S, and a flow of the fuel GS from the second fuel filter 16S interior toward the first storage member 18M is generated.

Further, even if a vapor component such as air bubbles or the like exists in the fuel GS that is being transported within the fuel transporting pipe 52 in the arrow F6 direction, because the vapor discharging pipe 64 is positioned further upward than the fuel transporting pipe 52, the air bubbles or the like can be made to move through the communication portion 74 to the vapor discharging pipe 64. The air bubbles that have moved to the vapor discharging pipe are discharged through the vapor discharging pipe 64 to the interior of the second storage member 18S.

In particular, in the present embodiment, the adjacent portion of the fuel transporting pipe 52 and the vapor discharging pipe 64 is provided at the highest position of the fuel transporting pipe 52, and the communication portion 74 is disposed at this portion. Namely, the jet pump 68 is provided at the highest position of the fuel transporting pipe 52. Therefore, air bubbles within the fuel transporting pipe 52 can effectively be made to move to the vapor discharging pipe 64.

Operation of the fuel supplying device 12 of the present embodiment is described next.

As shown in FIG. 1A, in the state in which a sufficient amount of the fuel GS exists within the fuel tank main body 14 (e.g., the state in which a fuel liquid surface LS is higher than the high position portion 36), at both of the first fuel accommodating portion 38M and the second fuel accommodating portion 38S, the fuel GS flows into the storage member 18 through the gap 28, and the fuel GS is stored within the storage member 18. Further, in this state, as can be understood from FIG. 1B, the fuel GS, that is in excess of the predetermined amount, exists also within the second fuel filter 16S of the second sub-cup 15S, and therefore, the float valve 54 rises. Due thereto, as shown by arrows F7, movement of the fuel GS from the fuel filter 16 interior toward the fuel transporting pipe 52 is possible.

Here, when the fuel pump main body 42 is driven, the fuel GS within the first fuel filter 16M is sucked-up through the fuel suction pipe 44A as shown by arrow F0. Together therewith, as shown by arrow F6, the fuel GS within the second fuel filter 16S is sucked-up from the fuel transporting pipe 52 and is transported via the merging portion 44J and the fuel suction pipe 44A. Then, the fuel GS is supplied from the fuel disgorge pipe 44B to an unillustrated engine or the like. At both the first sub-cup 15M and the second sub-cup 15S, foreign matter within the fuel is removed by the fuel filter 16.

In the present embodiment, in particular, the pressure loss of the lower surface filter cloth 16L is lower (smaller) than the pressure loss of the upper surface filter cloth 16U. Therefore, more fuel GS substantially passes-through the lower surface filter cloth 16L, and, as shown by arrows F2, flows into the fuel filter 16 interior. Further, as shown by arrows F3, the fuel GS within the fuel tank main body 14 flows through the gap 28 into the storage member 18 interior.

At this time, if at least one portion of the fuel filter 16 is immersed within the fuel, the oil film LM of the surface is maintained. Further, from the surface tension of the oil film, the energy that is needed in order to send-out the fuel is the relationship (vapor suction from vapor phase)>(fuel suction from liquid phase)

and therefore, only the fuel GS that is the liquid component is sucked and flows into the fuel filter 16 interior. Further, in these states, the fuel GS within the fuel filter 16 can be sent-out to the exterior due to the driving of the fuel pump module 32.

Further, in the present embodiment, the pressure loss of the fuel suction pipe 44A is set to be larger than the pressure loss of the fuel transporting pipe 52. Therefore, due to the driving of the fuel pump main body 42, the fuel GS is preferentially sucked from the second fuel filter 16S interior rather than first fuel filter 16M interior. By sending-out the fuel GS that is within the second sub-cup 15S to the exterior more preferentially than the fuel GS that is within the first sub-cup 15M in this way, the fuel GS can be held more reliably within the first fuel accommodating portion 38M than within the second fuel accommodating portion 38S.

Here, cases in which the fuel tank main body 14 tilts due to the vehicle traveling on a slope, and cases in which G acts on the fuel tank main body 14 at times of acceleration/deceleration or at times of turning or the like, are considered. In these cases, there are cases in which the fuel GS of the fuel tank main body 14 tends toward one side and liquid surface fluctuations, such as the fuel liquid surface LS tilting, arise (times when the liquid surface of the fuel tilts). In the fuel supplying device 12 of the present embodiment, because relatively more of the fuel GS remains in the first fuel accommodating portion 38M, the effect of preventing the occurrence of running-out of fuel at times when the liquid surface of the fuel tilts is strong.

When the fuel GS is preferentially sent-out from the second fuel accommodating portion 38S as described above, it is assumed that, as shown in FIG. 5A, the amount of fuel of the second fuel accommodating portion 38S becomes smaller than the amount of fuel of the first fuel accommodating portion 38M. However, if at least one portion (the lower surface filter cloth 16L in the present embodiment) of the second fuel filter 16S is immersed in the fuel GS, the oil film LM due to the fuel is formed and maintained at the surface of the second fuel filter 16S.

When the fuel pump main body 42 is driven, there are cases in which vapor (a vapor component of the fuel) is generated due to boiling under reduced pressure or the like of the fuel GS within the fuel pump main body 42. As shown by arrows F5 in FIG. 5A and FIG. 5C, the fuel that includes this vapor is discharged from the vapor discharging port (not illustrated) via the vapor discharging pipe 64 into the second storage member 18S. Accordingly, even in a state in which the amount of fuel within the second fuel accommodating portion 38S becomes low, there is a high possibility that the fuel GS will be stored within the second storage member 18S.

The bottom portion of the second storage member 18S is structured by the upper surface filter cloth 16U of the fuel filter 16. Namely, in the present embodiment, because the state in which the fuel GS is stored in the second storage member 18S is maintained, the state in which a portion of the second fuel filter 16S is immersed in the fuel GS also is maintained. Due thereto, the oil film LM that is formed at the surface of the second fuel filter 16S is continuously maintained. Accordingly, at the second sub-cup 15S, running-out of the oil film LM within the second fuel filter 16S is suppressed, and the fuel GS within the storage member 18 flows-in.

In this way, in the fuel supplying device 12 of the present embodiment, the oil film LM of the second fuel filter 16S of the second sub-cup 15S can be maintained more reliably, and therefore, vapor inadvertently flowing into the second fuel filter 16S interior is suppressed. Namely, due to the driving of the fuel pump main body 42, more (preferably all of) the fuel of the second fuel accommodating portion 38S can be sent-out.

Moreover, even in cases such as when the fuel GS moves from the first fuel accommodating portion 38M toward the second fuel accommodating portion 38S when the liquid surface of the fuel tilts for example, the path from the second fuel filter 16S of the second fuel accommodating portion 38S to the fuel pump main body 42 can be maintained in a state of being fully filled with liquid (a state in which a vapor component does not exist). When a vapor component exists, the need to discharge the vapor component at the time of driving the fuel pump main body 42 arises, and therefore, there is the concern that a long time will be needed in order to send-out the fuel (the responsiveness will deteriorate). However, in the present embodiment, the fuel GS can be sent-out to the exterior in a short time from the driving of the fuel pump main body 42 (the responsiveness of the sending-out of fuel is good).

Further, for example, in the initial state of the automobile in which this fuel supplying device 12 is installed (when the automobile is shipped-out from the factory, or the like), there is also the possibility that there will be a state in which, as shown in FIG. 6A, the fuel GS exists only in the first fuel accommodating portion 38M and the fuel GS does not exist in the second fuel accommodating portion 38S (the interior of the second sub-cup 15S (including the fuel filter 16)).

When the fuel pump main body 42 is driven in this state, because the fuel GS exists within the first fuel filter 16M, this fuel GS can be sent-out to the exterior. Moreover, the fuel GS that contains vapor within the fuel pump main body 42 is made to flow from the vapor discharging port through the vapor discharging pipe 64 as shown by arrow F5, and is discharged to the second storage member 18S interior. Due thereto, the fuel GS is stored in a short time within the second fuel filter 16S as well, and the oil film LM is formed in a short time at the surface of the second fuel filter 16S. Therefore, the sucking-in of a vapor component from the second fuel filter 16S through the fuel transporting pipe 52 can be suppressed.

In particular, in the present embodiment, the float valve 54 is disposed at the fuel transporting pipe 52 at the portion within the second fuel filter 16S. In the state in which the fuel GS of an amount exceeding a predetermined amount exists within the second fuel filter 16S, the float valve 54 is open (see FIG. 1B and FIG. 5B), and, in the state in which the fuel GS within the second fuel filter 16S is less than or equal to the predetermined amount, as shown in FIG. 6B, the float valve 54 falls, and the lower end portion of the fuel transporting pipe 52 is closed. Therefore, in the above-described initial state or the like, a vapor component being sucked from the second fuel filter 16S through the fuel transporting pipe 52 can be suppressed more reliably.

Further, the float valve 54 is provided at the fuel transporting pipe 52 at the lowermost end portion within the second fuel filter 16S. When the float valve 54 is provided at a position other than the lowermost end portion, a vapor component exists at the portion between the lowermost end portion and the float valve 54 (a portion of the fuel transporting pipe 52), and this becomes so-called dead gas, and there is the concern that the dead gas will be sent to the fuel pump main body 42. However, in the present embodiment, the generation of such dead gas also can be suppressed.

Note that, even if flowing-in of a vapor component into the fuel transporting pipe 52 is suppressed in this way, it is also assumed that, in the above-described initial state (at the time of being shipped-out from the factory) or in cases in which the amount of fuel of the second fuel accommodating portion 38S becomes extremely low, a vapor component, such as a few air bubbles or the like, will flow into the fuel transporting pipe 52.

In the present embodiment, the jet pump 68 is provided at the fuel transporting pipe 52, and air bubbles or the like within the fuel transporting pipe 52 can be moved through the communication portion 74 to the vapor discharging pipe 64 (the air bubbles that have moved to the vapor discharging pipe 64 are discharged into the storage member 18 of the second fuel accommodating portion 38S). Due thereto, a vapor component being sent from the second fuel accommodating portion 38S to the fuel pump main body 42 can be suppressed, and therefore, the responsiveness at the time of sending-out fuel to the exterior improves.

In particular, the communication portion 74 is disposed at the highest position of the fuel transporting pipe 52. Therefore, air bubbles within the fuel transporting pipe 52 can be effectively moved to the vapor discharging pipe 64.

Note that, in the present invention, as can be understood from the above explanation, essentially, a portion of the fuel GS is discharged into the second storage member 18S from a portion of the fuel delivery pipe 44 that is for sending the fuel GS out to the exterior. Accordingly, the above-described various types of structures (e.g., the structure of providing an opening/closing valve (the float valve 54) at the fuel transporting pipe 52, the structure of setting the pressure loss of the fuel suction pipe 44A to be greater than the pressure loss of the fuel transporting pipe 52, the structure of providing the jet pump 68, to which negative pressure from the vapor discharging pipe 64 is applied, at the fuel transporting pipe 52, and the like) can be appropriately (not necessarily all of them) combined with this essential structure.

Further, in the above description, an example is given of a structure in which the vapor discharging pipe 64, that discharges the fuel GS that includes vapor that is from the fuel pump main body 42, is discharged within the second storage member 18S, i.e., the vapor discharging pipe 64 structures the return pipe of the present invention. However, the present invention is not limited to this structure.

For example, as in a fuel supplying device 92 of a second embodiment that is shown in FIG. 7, the distal end of the return pipe 50, that is for discharging the return fuel from the pressure regulator 48, may be positioned within the second storage member 18S. In the structure of this modified example, the return fuel is stored within the second storage member 18S, and the fuel GS, that includes vapor that is from the vapor discharging pipe 64, is discharged into the first storage member 18M. Namely, the return pipe 50 structures the sending-back pipe of the present invention.

Note that, other than the above, the fuel supplying device 92 of the second embodiment is structured the same as the fuel supplying device 12 of the first embodiment, and therefore, detailed description thereof is omitted.

The opening/closing valve of the present invention is not limited to the above-described float valve 54. For example, a sensor that senses the amount of fuel may be provided within the second fuel filter 16S, and the opening/closing valve may be an electromagnetic valve that is opened and closed in accordance with the amount of fuel detected by this sensor.

Further, the fuel tank main body in the present invention is not limited to the saddle-shaped fuel tank having the first fuel accommodating portion 38M and the second fuel accommodating portion 38S such as described above. In other words, the accommodating portion at which the fuel pump main body 42 is provided is the first fuel accommodating portion (the first fuel accommodating portion 38M in the above-described embodiment), and the accommodating portion at which the fuel pump main body 42 is not provided is the second fuel accommodating portion (the second fuel accommodating portion 38S in the above-described embodiment). A plurality of each of the first fuel accommodating portion and second fuel accommodating portion may be provided.

Moreover, the structure of the fuel tank main body in the present invention also is not limited to a saddle-shaped fuel tank. For example, there may be a structure in which the first fuel accommodating portion and the second fuel accommodating portion of the present invention are formed in the shapes of boxes that are separate bodies that are independent of one another, and the fuel transporting pipe 52 and the return pipe (the vapor discharging pipe 64 or the return pipe 50 in the above-described embodiments) are provided therebetween.

The relationship between the storage member 18, and the fuel suction pipe 44A and the fuel transporting pipe 52, also is not limited to that described above. For example, at the first fuel accommodating portion 38M, there may be a structure in which the fuel suction pipe 44A passes-through the cover plate portion 22 at a position that is different than the flow-in hole 24 of the cover plate portion 22. Similarly, at the second fuel accommodating portion 38S, there may be a structure in which the fuel transporting pipe 52 passes-through the cover plate portion 22 at a position that is different than the flow-in hole 24 of the cover plate portion 22.

Further, there may be a structure in which the storage member 18 does not cover a portion of the fuel filter 16 (as seen from above, a portion of the fuel filter 16 juts-out to the outer side from the storage member 18). In this case, if the fuel suction pipe 44A or the fuel transporting pipe 52 is connected to the jutting-out portion of the fuel filter 16 (the exterior of the storage member 18), there can be a structure in which the fuel suction pipe 44A or the fuel transporting pipe 52 does not pass-through the cover plate portion 22.

The invention claimed is:

1. A fuel supplying device, comprising:
a first fuel accommodating portion and a second fuel accommodating portion, each being configured to accommodate fuel;
a first fuel filter formed in a shape of a bag and provided at the first fuel accommodating portion, the first fuel filter being configured to: remove foreign matter from the fuel in response to fuel flowing into an interior of the first fuel filter, and form an oil film produced by the fuel on a surface of the first fuel filter in response to a portion or an entirety of the first fuel filter being immersed in fuel;
a second fuel filter formed in a shape of a bag and provided at the second fuel accommodating portion, the second fuel filter being configured to: remove foreign matter from the fuel in response to fuel flowing into an interior of the second fuel filter, and form an oil film produced by the fuel on a surface of the second fuel filter in response to a portion or an entirety of the second fuel filter being immersed in fuel;
a first storage member provided within the first fuel accommodating portion and above the first fuel filter, a bottom portion of the first storage member consisting of a surface of the first fuel filter, and the first storage member being configured to store fuel;
a second storage member provided within the second fuel accommodating portion and above the second fuel filter, a bottom portion of the second storage member being structured by at least one portion of an upper surface of the second fuel filter, and the second storage member being configured to store fuel;
delivery means configured to deliver fuel to an exterior, the delivery means including: a delivery pipe extending from within the first fuel filter to an exterior of the first fuel accommodating portion, and a fuel pump provided in the delivery pipe;
a fuel transporting pipe connecting the second fuel filter interior to a fuel suction port of the fuel pump, the second fuel filter interior being communicable with the fuel suction port of the fuel pump via the fuel transporting pipe;
a sending-back pipe connecting an interior of the second storage member to the delivery means, the sending-back pipe being configured to send back a portion of the fuel that flows through the delivery means to an interior of the second storage member in response to an operation of the fuel pump;
a communication portion configured to communicate between the fuel transporting pipe with the sending-back pipe; and
a jet pump that is provided in the communication portion, and being configured to generate negative pressure based on fuel flowing through the sending-back pipe, and by applying the negative pressure to an interior of the fuel transporting pipe, the jet pump generates a flow of fuel from the second fuel filter interior toward an interior of the first storage member.

2. The fuel supplying device of claim 1, wherein the communication portion is provided at a highest position of the fuel transporting pipe.

3. A fuel supplying device, comprising:
a first fuel accommodating portion and a second fuel accommodating portion, each being configured to accommodate fuel;
a first fuel filter formed in a shape of a bag and provided at the first fuel accommodating portion, the first fuel filter being configured to: remove foreign matter from the fuel in response to fuel flowing into an interior of the first fuel filter, and form an oil film produced by the fuel on a surface of the first fuel filter in response to a portion or an entirety of the first fuel filter being immersed in fuel;
a second fuel filter formed in a shape of a bag and provided at the second fuel accommodating portion, the second fuel filter being configured to: remove foreign matter from the fuel in response to fuel flowing into an interior of the second fuel filter, and form an oil film produced by the fuel on a surface of the second fuel filter in response to a portion or an entirety of the second fuel filter being immersed in fuel;
a first storage member provided within the first fuel accommodating portion and above the first fuel filter, a bottom portion of the first storage member being structured by at least one portion of an upper surface of the first fuel filter, and the first storage member being configured to store fuel;
a second storage member provided within the second fuel accommodating portion and above the second fuel filter, a bottom portion of the second storage member being structured by at least one portion of an upper surface of the second fuel filter, and the second storage member being configured to store fuel;
delivery means configured to deliver fuel to an exterior, the delivery means including: a delivery pipe extending from within the first fuel filter to an exterior of the first fuel accommodating portion, and a fuel pump provided in the delivery pipe;
a fuel transporting pipe connecting the second fuel filter interior to a fuel suction port of the fuel pump, the second fuel filter interior being communicable with the fuel suction port of the fuel pump via the fuel transporting pipe;

a sending-back pipe connecting an interior of the second storage member to the delivery means, the sending-back pipe being configured to send back a portion of the fuel that flows through the delivery means to an interior of the second storage member in response to an operation of the fuel pump;

a communication portion configured to communicate between the fuel transporting pipe with the sending-back pipe; and a jet pump that is provided in the communication portion, and being configured to generate negative pressure based on fuel flowing through the sending-back pipe, and by applying the negative pressure to an interior of the fuel transporting pipe, the jet pump generates a flow of fuel from the second fuel filter interior toward an interior of the first storage member, wherein the first storage member includes a first side wall and a second side wall, the first fuel filter includes a first end and second end, and the first end of the first fuel filter is joined to the first side wall of the first storage member, and the second end of the first fuel filter is joined to the second side wall of the first storage member.

4. The fuel supplying device of claim 3, wherein the communication portion is provided at a highest position of the fuel transporting pipe.

* * * * *